United States Patent
Rodey

(10) Patent No.: US 12,372,358 B2
(45) Date of Patent: Jul. 29, 2025

(54) DETERMINING A VIRTUAL REPRESENTATION OF AT LEAST PART OF AN ENVIRONMENT

(71) Applicant: A. P. Møller—Mærsk A/S, Copenhagen K (DK)

(72) Inventor: Patrick Michael Rodey, Svedala (SE)

(73) Assignee: A. P. Møller—Mærsk A/S, Copenhagen K (DK)

( * ) Notice: Subject to any disclaimer, the term of this patent is extended or adjusted under 35 U.S.C. 154(b) by 677 days.

(21) Appl. No.: 17/074,183

(22) Filed: Oct. 19, 2020

(65) Prior Publication Data
US 2021/0035452 A1     Feb. 4, 2021

Related U.S. Application Data

(63) Continuation of application No. PCT/EP2019/059837, filed on Apr. 16, 2019.

(30) Foreign Application Priority Data

Apr. 20, 2018  (GB) ..................................... 1806510

(51) Int. Cl.
*G08G 3/00* (2006.01)
*B63B 35/68* (2006.01)
(Continued)

(52) U.S. Cl.
CPC ............ *G01C 21/203* (2013.01); *B63B 35/68* (2013.01); *B63B 79/40* (2020.01); *G01S 17/89* (2013.01);
(Continued)

(58) Field of Classification Search
CPC .. G01C 21/203; G05D 1/0011; G05D 1/0038; G05D 1/0044; G05D 1/0206;
(Continued)

(56) References Cited

U.S. PATENT DOCUMENTS 3,769,442 A    10/1973 Heartz et al.
6,525,762 B1   2/2003 Mileski et al.
(Continued)

FOREIGN PATENT DOCUMENTS

CN    105021228 A    11/2015
CN    105539797 A    5/2016
(Continued)

OTHER PUBLICATIONS

Behroozpour et al., Lidar System Architectures and Circuits, 2017, IEEE (Year: 2017).*

(Continued)

*Primary Examiner* — Russell Frejd
*Assistant Examiner* — Sara J Lewandroski
(74) *Attorney, Agent, or Firm* — EIP US LLP

(57) ABSTRACT

Disclosed is a system 1000 for determining a virtual representation of at least part of an environment 800 that is navigable by a ship 700. The system has at least one beacon 101, 102, 201, 202, 301, 302, 401-403 remote from the ship. The or each beacon comprises at least one sensor 411-415 for sensing surroundings information representative of at least part of the environment, a transmitter 420, and a controller 430 connected to the at least one sensor and configured to cause the surroundings information to be transmitted via the transmitter. The system also comprises a control centre 500 remote from the ship. The control centre comprises a receiver 520 configured to receive the surroundings information, and a control unit 530 connected to the receiver and configured to determine a virtual representation of at least part of the environment based on the surroundings information. The virtual representation may comprise a topographical map, such as a LIDAR map.

11 Claims, 4 Drawing Sheets

(51) Int. Cl.
  *B63B 79/40*  (2020.01)
  *G01C 21/20*  (2006.01)
  *G01S 17/89*  (2020.01)
  *G05D 1/00*  (2024.01)
  *G05D 1/02*  (2020.01)
  *H04L 67/12*  (2022.01)
  *H04W 4/024*  (2018.01)

(52) U.S. Cl.
  CPC ......... *G05D 1/0011* (2013.01); *G05D 1/0206* (2013.01); *G08G 3/00* (2013.01); *H04L 67/12* (2013.01); *H04W 4/024* (2018.02)

(58) Field of Classification Search
  CPC ........ G08G 3/00; H04W 4/024; H04W 4/025; H04W 4/026; H04W 4/027; B63B 79/10; B63B 79/15; B63B 79/20; B63B 79/40; G01S 17/89
  See application file for complete search history.

(56) References Cited

U.S. PATENT DOCUMENTS

| | | | |
|---|---|---|---|
| 2002/0149996 A1 | 10/2002 | Carreiro | |
| 2003/0028293 A1 | 2/2003 | Jankowiak et al. | |
| 2003/0167125 A1 | 9/2003 | Seemann et al. | |
| 2010/0131133 A1 | 5/2010 | Koda et al. | |
| 2014/0007017 A1* | 1/2014 | Sternfeld | G06F 16/29 715/848 |
| 2014/0160165 A1* | 6/2014 | Kim | G01C 21/005 345/633 |
| 2015/0078123 A1* | 3/2015 | Batcheller | G01S 15/86 367/7 |
| 2015/0241560 A1* | 8/2015 | Lee | G01S 13/66 701/454 |
| 2016/0266246 A1* | 9/2016 | Hjelmstad | G01S 15/86 |
| 2016/0359570 A1* | 12/2016 | Felemban | G01S 19/51 |
| 2016/0378107 A1 | 12/2016 | Morin et al. | |
| 2017/0108580 A1 | 4/2017 | Weng et al. | |
| 2018/0043976 A1* | 2/2018 | Nakamoto | H04W 4/024 |
| 2018/0094934 A1* | 4/2018 | Rivers | G05D 1/0206 |
| 2018/0158340 A1* | 6/2018 | de Moura | G07C 5/008 |
| 2018/0292215 A1* | 10/2018 | Akuzawa | G05D 1/0011 |

FOREIGN PATENT DOCUMENTS

| | | | | |
|---|---|---|---|---|
| CN | 106200653 A | 12/2016 | | |
| CN | 106324599 A | 1/2017 | | |
| CN | 205940569 U | 2/2017 | | |
| CN | 106814735 A * | 6/2017 | ........... | G05D 1/0206 |
| CN | 107730582 A | 2/2018 | | |
| EP | 3109659 A1 | 12/2016 | | |
| EP | 3279076 A1 | 2/2018 | | |
| GB | 2441802 A | 3/2008 | | |
| JP | 2003518307 A | 6/2003 | | |
| JP | 2010216904 A | 9/2010 | | |
| KR | 100702448 B1 * | 4/2007 | | |
| KR | 101023836 B1 * | 3/2011 | | |
| KR | 20150106595 A | 9/2015 | | |
| KR | 20150140173 A | 12/2015 | | |
| WO | 2017129859 A1 | 8/2017 | | |
| WO | WO-2017138127 A1 * | 8/2017 | ............ | B63B 49/00 |
| WO | 2017167905 A1 | 10/2017 | | |

OTHER PUBLICATIONS

Holon et al., First continuous seabed map in France used for the creation of a management tool protecting Posidonia Oceanica, 2014, AndromÃ¨de OcÃ©anologie (Year: 2014).*
Mayer, Frontiers in seafloor mapping and visualization, 2006, Marine Geophysical Researchers (Year: 2006).*
International Search Report and Written Opinion dated Aug. 1, 2019 for PCT Application No. PCT/EP2019/059837.
United Kingdom Combined Search and Examination Report dated Oct. 19, 2018 for GB Application No. 1806510.2.
Anonymous, "Navionics Revolutionizes Nautical Chart Accuracy", Jun. 17, 2013 (Jun. 17, 2013), XP055578668, URL:https://d2wb2wm9dm62ai.cloudfront.net/migration/documents/BD%20Outdoors%20Jun%202013.pdf.
Singapore Search report and Written Opinion dated Nov. 8, 2021 for Singapore Patent Application No. 11202010384W.
United Kingdom Examination report dated Jul. 20, 2021 for United Kingdom Application No. GB1806510.2.
Anonymous: "Boaters can now map their own area", Oct. 3, 2013 (Oct. 3, 2013).
European Summons to attend oral proceedings dated Jun. 2, 2023 for European Application No. 19722798.6.
Chinese Office Action dated Oct. 31, 2023 for Chinese Patent Application No. 201980026657.6.
Zou Youjia et al., "Technical Manual for Ship Navigation", Make Zou Youjia, etc., Shanghai Jiaotong University Academic Press, Jun. 30, 2017.
Zhou Feng, "Ship driving automation", Shanghai Jiaotong University Academic Press, Jan. 31, 2014.

* cited by examiner

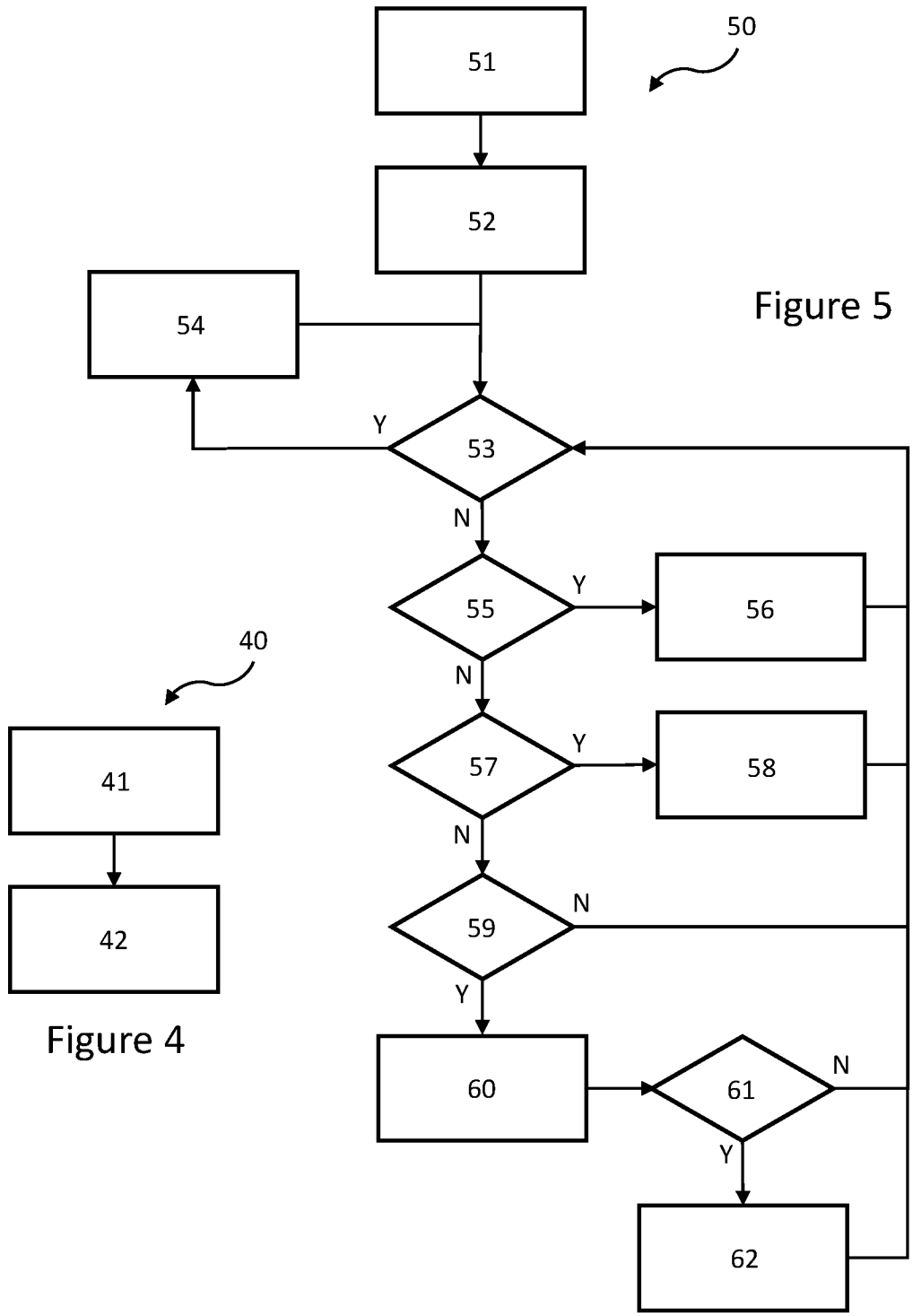

DETERMINING A VIRTUAL REPRESENTATION OF AT LEAST PART OF AN ENVIRONMENT

CROSS-REFERENCE TO RELATED APPLICATIONS

This application is a continuation of International Application No. PCT/EP2019/059837, filed Apr. 16, 2019 which claims priority to UK Application No. GB 1806510.2, filed Apr. 20, 2018, under 35 U.S.C. § 119(a). Each of the above-referenced patent applications is incorporated by reference in its entirety.

BACKGROUND OF THE INVENTION

Field of the Invention

The present invention relates to systems for, and methods of, determining a virtual representation of at least part of an environment that is navigable by a ship.

Description of the Related Technology

Marine vessels, and particularly large marine vessels such as container ships, can have blind spots. As a result, the captain of the vessel is unable to see fully around the vessel from the bridge of the vessel. This can prove challenging during navigation of the vessel, particularly during precision operations such as berthing.

Moreover, when a large marine vessel is moving in a particular environment, such as a harbour, a port, a bay, a dockyard, a navigable channel, a lake, a canal or a river, a pilot with a good knowledge of the environment may be required to aid navigation. The pilot brings to the vessel expertise in handling large vessels in confined waterways, and expert knowledge of the environment. For example, the pilot will have knowledge of local visual reference points, knowledge of tides, swells, currents and depths that might not be easily identifiable on navigation charts.

Typically, the pilot must board the vessel before the vessel enters the relevant waterway. This can be particularly dangerous in bad weather, as the pilot can face considerable risk of falling overboard. Furthermore, in some cases there is a limited number of pilots, and so the vessel may have to wait for an extended period before entering the relevant waterway while a pilot becomes available and travels to the vessel. In some cases, the pilot may have to travel several kilometres out to sea, e.g. by boat or helicopter, to meet and board the vessel.

In some cases, the state of the environment is dynamic. For example, some waterways may be prone to regular shifts in the navigation channels, e.g. due to shifting sand bars. As such, the pilot must regularly update his or her knowledge of the environment, so as to be able to safely aid navigation of vessels through the environment.

Embodiments of the present invention aim to address the aforementioned problems.

SUMMARY

A first aspect of the present invention provides a system for determining a virtual representation of at least part of an environment that is navigable by a ship, the system having: at least one beacon remote from the ship, the or each beacon comprising: at least one sensor for sensing surroundings information representative of at least part of the environment, a transmitter, and a controller connected to the at least one sensor and configured to cause the surroundings information to be transmitted via the transmitter; and a control centre remote from the ship, the control centre comprising: a receiver configured to receive the surroundings information, and a control unit connected to the receiver and configured to determine a virtual representation of at least part of the environment based on the surroundings information.

Such a virtual representation may be usable by a pilot to provide navigation instructions, or at least information relating to the environment, to the captain so that the captain is able to navigate the environment without issue. Alternatively, the virtual representation may be providable to, and usable by, the captain or crew themselves to aid navigation of their ship in the environment. In either scenario, the virtual representation may provide sufficient situational awareness of the environment that the pilot need not board the ship to assist. For example, on the basis of the virtual representation, the pilot may be able to conduct piloting of the ship from a location remote from the ship, such as by issuing navigation instructions to the ship via a communications link between the pilot (e.g. in the control centre) and the ship.

Optionally, the virtual representation is a dynamic virtual representation.

It will further be noted that, since beacon(s) remote from the ship are used, the system is usable to aid navigation of ships that do not themselves comprise such sensor(s) for sensing surroundings information representative of at least part of the environment. Accordingly, the system is very versatile and can be implemented without any modifications being required to shipping fleets. Furthermore, the system can be used to determine a virtual representation of at least part of the environment before the ship has arrived in the environment.

Optionally, the control unit is configured to update at least a portion of the virtual representation based on further surroundings information sensed by the at least one sensor and received via the receiver.

Optionally, the control centre comprises a transmitter connected to the control unit, and the control unit is configured to cause the virtual representation to be transmitted by the transmitter of the control centre. Optionally, the system has a terminal, comprising: a receiver configured to receive the virtual representation, an output device, and a control unit connected to the receiver of the terminal and configured to cause information to be output on the output device based on the virtual representation received. Optionally, the terminal is portable.

Optionally, the control unit is configured to determine navigation information for use in assisting navigation of the ship based on the surroundings information or based on the virtual representation. Optionally, the control centre comprises a transmitter connected to the control unit, and the control unit is configured to cause the navigation information to be transmitted by the transmitter of the control centre. Optionally, the transmitter is configured to transmit the navigation information to the ship. Optionally, the transmitter is configured to transmit the navigation information to a terminal of the system.

Optionally, the control unit is configured to generate an instruction to sense surroundings information representative of at least part of the environment, the control centre comprises a transmitter connected to the control unit, the control unit is configured to cause the transmitter of the control centre to transmit the instruction, and the beacon comprises a receiver configured to receive the instruction. Optionally, the beacon comprises one or more manoeuvring units for controlling movement of the beacon in water, and the controller of the beacon is connected to the receiver of the beacon and is configured to control the one or more manoeuvring units based on the instruction.

Optionally, the at least one sensor comprises one or more of: a camera, a LIDAR sensor, a SONAR, and a RADAR.

Optionally, the surroundings information comprises one or more of: one or more images, one or more videos, LIDAR information from one or more LIDAR sensors, SONAR information from one or more SONAR sensors, RADAR information from one or more RADAR sensors, sound information from one or more microphones, position information from one or more position sensors, and movement information from one or more movement sensors.

Optionally, the surroundings information is representative of topography of the at least part of the environment, and the virtual representation comprises a topographical map. Optionally, the topographical map comprises a LIDAR map.

Optionally, the at least one beacon comprises a static land-based beacon, a mobile land-based beacon, a static water-based beacon, or a mobile water-based beacon.

Optionally, the at least one beacon comprises a tugboat or a buoy. Optionally, the at least one beacon comprises a plurality of tugboats and/or buoys.

Optionally, the at least one beacon comprises plural such beacons, the receiver of the control centre is configured to receive surroundings information from respective transmitters of the beacons, and the control unit is configured to determine the virtual representation of the at least part of the environment based on the surroundings information received from the respective transmitters of the beacons.

A second aspect of the present invention provides a tugboat, comprising: at least one sensor for sensing surroundings information representative of at least part of an environment; a transmitter, and a controller connected to the at least one sensor and configured to cause the transmitter to transmit the surroundings information towards a receiver of a control centre remote from the tugboat.

Optionally, the tugboat comprises: one or more manoeuvring units for controlling movement of the tugboat in water, and a receiver configured to receive an instruction from a transmitter of the control centre, wherein the controller is connected to the receiver and configured to control the one or more manoeuvring units based on the instruction.

Optionally, the surroundings information is representative of topography of the at least part of the environment.

Optionally, the at least one sensor comprises one or more of: a camera, a LIDAR sensor, a SONAR, and a RADAR.

Optionally, the surroundings information comprises one or more of: one or more images, one or more videos, LIDAR information from one or more LIDAR sensors, SONAR information from one or more SONAR sensors, RADAR information from one or more RADAR sensors, sound information from one or more microphones, position information from one or more position sensors, and movement information from one or more movement sensors.

A third aspect of the present invention provides a buoy, comprising: at least one sensor for sensing surroundings information representative of at least part of an environment; a transmitter, and a controller connected to the at least one sensor and configured to cause the transmitter to transmit the surroundings information towards a receiver of a control centre remote from the buoy.

Optionally, the surroundings information is representative of topography of the at least part of the environment.

Optionally, the at least one sensor comprises one or more of: a camera, a LIDAR sensor, a SONAR, and a RADAR.

Optionally, the surroundings information comprises one or more of: one or more images, one or more videos, LIDAR information from one or more LIDAR sensors, SONAR information from one or more SONAR sensors, RADAR information from one or more RADAR sensors, sound information from one or more microphones, position information from one or more position sensors, and movement information from one or more movement sensors.

A fourth aspect of the present invention provides a method of determining a virtual representation of at least part of an environment that is navigable by a ship, the method comprising: receiving, from a beacon remote from the ship and at a control centre remote from the ship, surroundings information representative of at least part of the environment, and determining a virtual representation of at least part of the environment based on the surroundings information.

Optionally, the surroundings information is representative of topography of the at least part of the environment, and the determining comprises determining a topographical map of the at least part of the environment based on the surroundings information. Optionally, the topographical map comprises a LIDAR map.

Optionally, the method comprises receiving, from plural beacons remote from the ship and at a control centre remote from the ship, surroundings information representative of at least part of the environment, and determining the virtual representation of the at least part of the environment based on the surroundings information received from the plurality of beacons.

Optionally, the surroundings information comprises one or more of: one or more images, one or more videos, LIDAR information from one or more LIDAR sensors, SONAR information from one or more SONAR sensors, RADAR information from one or more RADAR sensors, sound information from one or more microphones, position information from one or more position sensors, and movement information from one or more movement sensors.

Optionally, the virtual representation is a dynamic virtual representation.

A fifth aspect of the present invention provides a non-transitory computer-readable storage medium storing instructions that, if executed by a processor of a control centre, cause the processor to carry out the method of the fourth aspect of the present invention.

BRIEF DESCRIPTION OF THE DRAWINGS

Embodiments of the invention will now be described, by way of example only, with reference to the accompanying drawings, in which:

FIG. 4 shows a flow chart illustrating an example of a method of determining a virtual representation of at least part of an environment that is navigable by a ship; and FIG. 5 shows a flow chart illustrating an example of another method of determining a virtual representation of at least part of an environment that is navigable by a ship.

DETAILED DESCRIPTION OF CERTAIN INVENTIVE EMBODIMENTS

Figure 1:
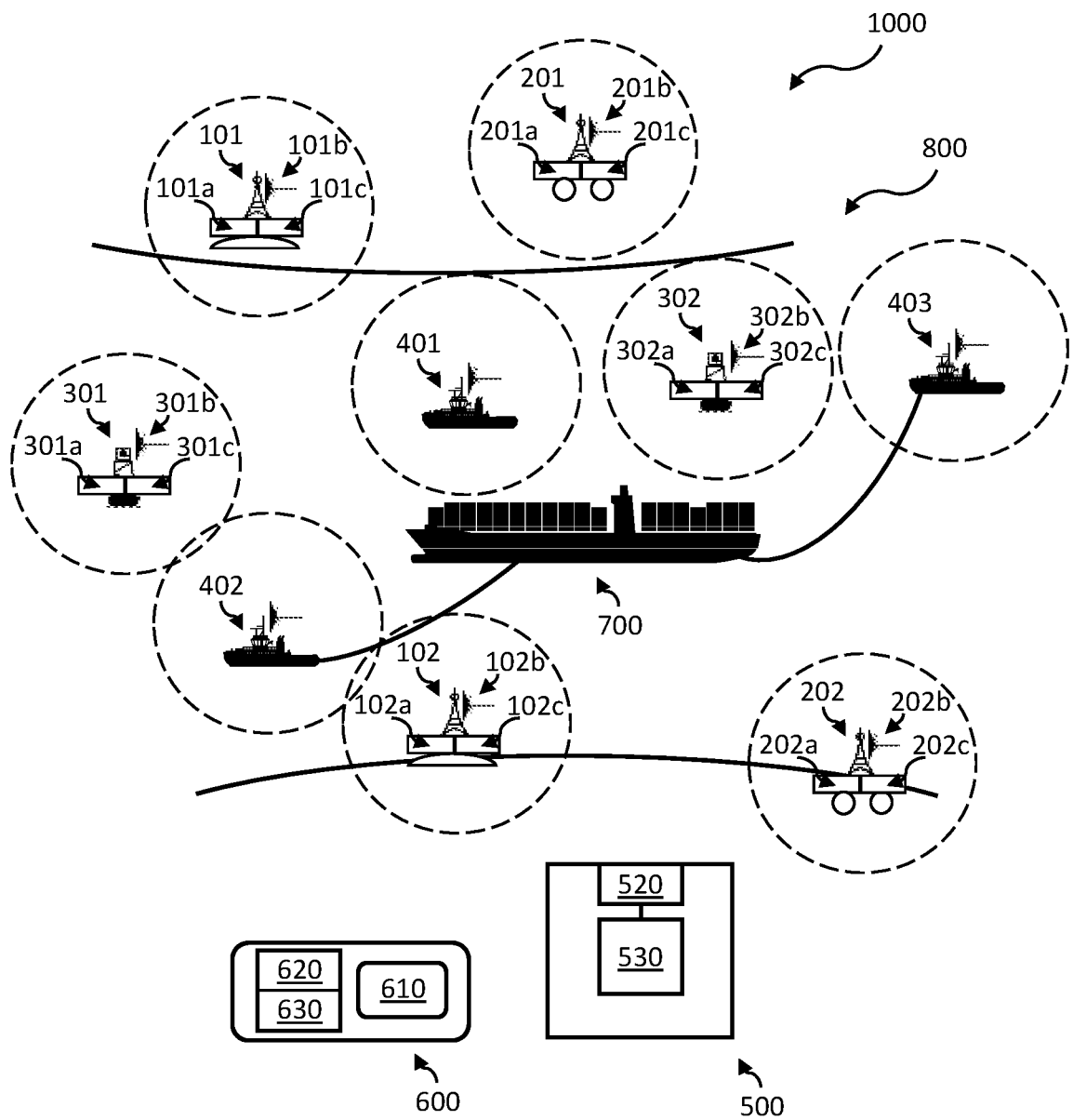
FIG. 1 shows a schematic view of an example of a system for determining a virtual representation of at least part of an environment that is navigable by a ship.

Referring to FIG. 1, there is shown a schematic view of an example of a system according to an embodiment of the present invention. The system 1000 is for determining a virtual representation of at least part of an environment 800 that is navigable by a ship 700. The environment 800 may, for example, comprise one or more of: a harbour, a port, a bay, a dockyard, a navigable channel, a lake, a canal, and a river. The environment 800 may comprise a marine environment. In some embodiments, the virtual representation is a dynamic virtual representation.

Broadly speaking, the system 1000 comprises a plurality of beacons 101, 102, 201, 202, 301, 302, 401-403 remote from the ship 700. Each of the beacons comprises at least one sensor 101*a*, 102*a*, 201*a*, 202*a*, 301*a*, 302*a*, 411-415 for sensing surroundings information representative of at least part of the environment 800. Moreover, each of the beacons comprises a transmitter 101*b*, 102*b*, 201*b*, 202*b*, 301*b*, 302*b*, 420, and a controller 101*c*, 102*c*, 201*c*, 202*c*, 301*c*, 302*c*, 430 that is connected to the at least one sensor and to the transmitter and is configured to cause the surroundings information to be transmitted via the transmitter 101*b*, 102*b*, 201*b*, 202*b*, 301*b*, 302*b*, 420. The system 1000 also comprises a control centre 500 that is remote from the ship 700. The control centre 500 comprises a receiver 520 configured to receive the surroundings information from the respective transmitters of the beacons, and a control unit 530 connected to the receiver 520 and configured to determine a virtual representation of at least part of the environment 800, based on the surroundings information received from the respective transmitters of the beacons. The illustrated system 1000 of this embodiment also comprises a portable terminal 600, which will be described in more detail below. In other embodiments, the portable terminal 600 may be omitted.

As used herein, "environment" means a particular location. The environment 800 in this embodiment comprises a waterway (such as a harbour, a port, a bay, a dockyard, a navigable channel, a lake, a canal or a river), and obstacles in the waterway, such as other vessels, navigational aids, piers and the beacon(s). However, in other embodiments, the environment 800 may comprise a waterway and not any obstacles therein. The environment may comprise a marine environment.

As used herein, "surroundings information representative of at least part of the environment" means information about the conditions or characteristics of at least part of the environment. The conditions may comprise water conditions, such as information relating to any one or more of: tides, swells, currents, depths, temperature, and ice coverage. The conditions may alternatively, or additionally, comprise weather conditions, such as information relating to any one or more of: wind speed, wind direction, temperature, precipitation, visibility, humidity and pressure. The virtual representation determined using the surroundings information could thus include non-physical characteristics or parameters of the environment. The characteristics may comprise topography of the environment. As used herein, "topography" means the physical shape or contours of a physical environment, such as a bed or floor of the waterway, the body of water in the waterway, a shoreline or other delimiter of the body of water, and obstacles in or on the waterway, such as the ship or other vessels. The term "topography" does not, for example, encompass weather conditions or the state of the atmosphere in the environment. The virtual representation determined using the surroundings information could thus include physical characteristics or parameters of the environment. A topographical map is an example of the virtual representation.

In this embodiment, the surroundings information is representative of topography of the at least part of the environment 800, and the control unit 530 of the control centre 500 is configured to determine a topographical map of the environment 800 based on the surroundings information representative of topography of the at least part of the environment 800, as will be discussed in more detail below.

In this embodiment, two of the beacons are static land-based beacons 101, 102, which may for example take the form of a mast or a building. Static land-based beacons are in respective fixed locations on land relative to the environment 800. Each of the locations may, for example, be on land at a side of a waterway of the environment 800, or may be on a pier, or island or other fixed body within the waterway. However, in other embodiments, the system 1000 may comprise more or fewer static land-based beacons, such as just one static land-based beacon. In some embodiments, there may no static land-based beacons in the system 1000.

In this embodiment, two of the beacons are mobile land-based beacons 201, 202, which may, for example, take the form of a vehicle. Mobile land-based beacons are able to move or be moved on land relative to the environment 800. Again, the land may be at a side of a waterway of the environment 800, or may be on a pier or island or other fixed body within the waterway. However, in other embodiments, the system 1000 may comprise more or fewer mobile land-based beacons, such as just one mobile land-based beacon. In some embodiments, there may no mobile land-based beacons in the system 1000.

In this embodiment, a further two of the beacons are static water-based beacons 301, 302. Static water-based beacons are buoyant apparatuses within water in respective fixed locations relative to the environment 800. Each of the locations may, for example, be anchored within the waterway of the environment 800. In this embodiment, each of the static water-based beacons is a buoy, but in other embodiments they could take the form of a different type of navigational aid. The, or each of the, water-based beacon(s) may, for example, be battery powered or have a rechargeable battery that is recharged by a renewable energy source, such as solar, wind or wave. In some embodiments, the system 1000 may comprise more or fewer static water-based beacons, such as just one static water-based beacon. In some embodiments, there may no static water-based beacons in the system 1000.

In this embodiment, a further three of the beacons are mobile water-based beacons 401, 402, 403. Mobile water-based beacons are buoyant apparatuses located within water that are able to move in the water relative to the environment 800. In some embodiments, one, some or each of the mobile water-based beacons is a boat or other watercraft. In this embodiment, each of the mobile water-based beacons is a tugboat. A first 401 of these tugboats will be described in more detail below, by way of example only. The other two tugboats 402, 403 have the same elements as the first tugboat 401 in this embodiment, and so will not be described separately. However, in other embodiments, the tugboats 401-403 may differ from each other, for example in the type(s) of sensor(s) they comprise. It will be noted that, in this embodiment, the other two tugboats 402, 403 are assisting the ship 700 through the environment 800. Such assistance would, per se, be understood by the skilled person, and so no further discussion is provided herein in the interests of brevity. However, in other embodiments, the tugboats 401-403 of the system 1000 need not be involved with assisting the ship 700 through the environment 800. Indeed, in some embodiments, the system 1000 is for determining a virtual representation of at least part of the environment 800 before the ship 700 has entered the environment 800 in question. In some embodiments, the system 1000 may comprise more or fewer mobile water-based beacons, such as just one mobile water-based beacon. In some embodiments, there may no mobile water-based beacons in the system 1000.

The distribution of static land-based beacon(s), mobile land-based beacon(s), static water-based beacon(s) (such as buoys), and/or mobile water-based beacons (such as tugboats) will depend on the environment 800 and the amount of water traffic in the environment 800.

In some embodiments, the environment 800 comprises a port. In some embodiments, the entire port is covered or sensed all the time by one or more static or fixed beacon(s). In other embodiments, only some of the port is covered or sensed by one or more fixed beacon(s). In some embodiments, one or more mobile beacon(s) must move to be used to sense surroundings information of one or more parts of the port that are not covered or sensed by a fixed beacon.

Figure 2:
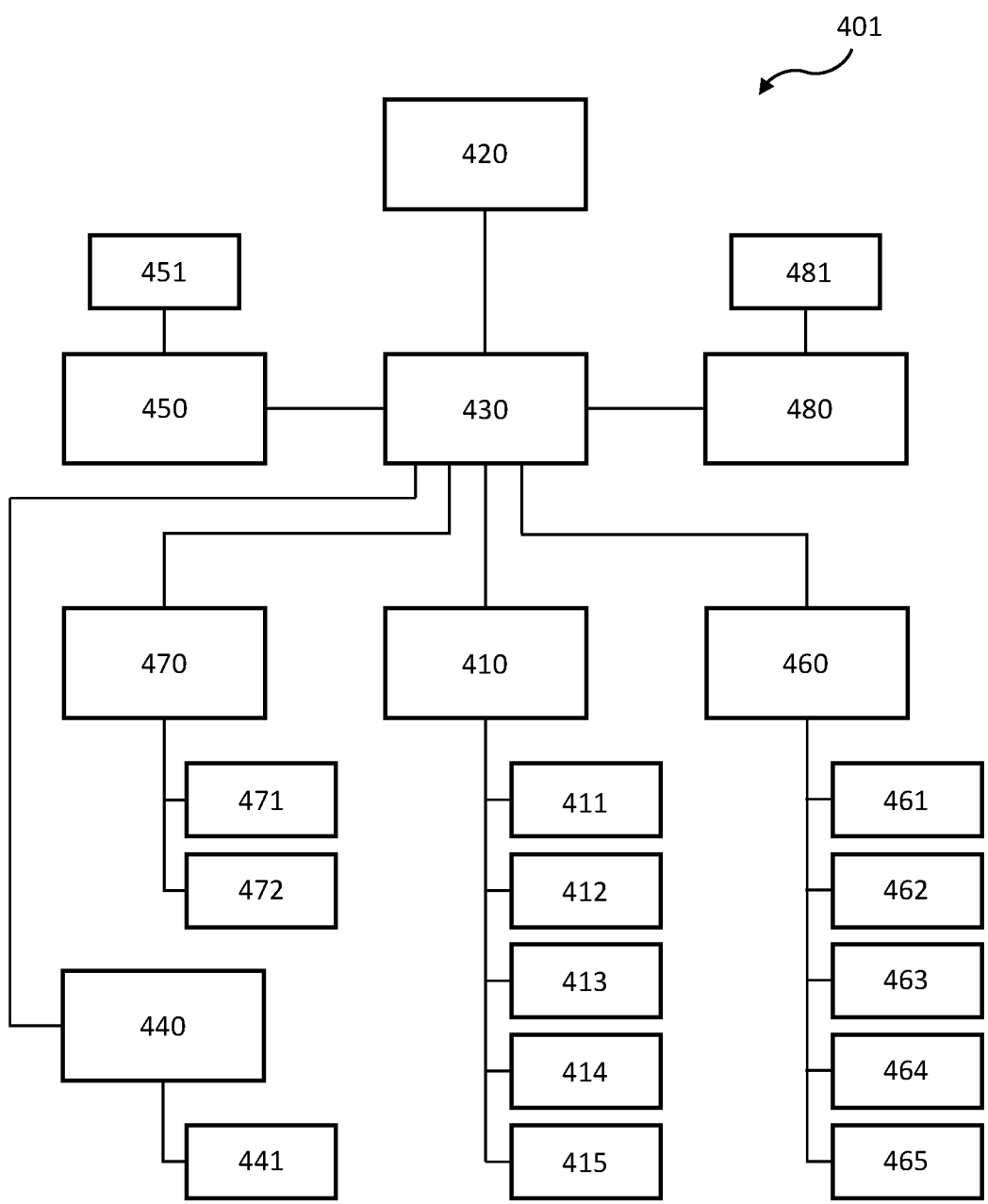
FIG. 2 shows a schematic view of an example of a tugboat.

Referring to FIG. 2, there is shown a schematic view of the tugboat 401 of the system 1000 of FIG. 1. The purpose of a tugboat is to transfer mechanical energy from the tugboat to a ship to be towed or otherwise assisted. Tugboats are adapted to this task by the provision of powerful diesel electric or diesel drives and have extremely high power to tonnage ratios in order to be able to provide large pulling or pushing forces. In this particular embodiment, the tugboat 401 in question is not mechanically assisting the ship 700 within the environment 800. However, in other embodiments, the tugboat 401 may be mechanically assisting the ship 700 within the environment 800, for example along with one or more other tugboats 402, 403.

Broadly speaking, the tugboat 401 comprises at least one sensor 411-415 for sensing surroundings information representative of at least part of an environment; a transmitter 420, and a controller 430 connected to the at least one sensor 411-415 and to the transmitter 420 and configured to cause the transmitter 420 to transmit the surroundings information towards a receiver 520 of a control centre remote 500 from the tugboat 401.

In this embodiment, the tugboat 401 comprises one or more modules for controlling systems within the tugboat 401. In some embodiments, the modules are parts of the controller 430. Alternatively, the functionality of the modules may be located in one or more ancillary control units positioned on the tugboat 401, separate from the controller 430. The functionality of the controller 430 and the modules can be implemented with software, hardware or a combination of both.

In this embodiment, the transmitter 420 is a transmitter-receiver, which is configured to receive information and to transmit information. In other embodiments, the tugboat 401 may comprise a transmitter 420 for transmitting information and a separate receiver for receiving information.

In this embodiment, the controller 430 is connected to a situational awareness module 410. The situational awareness module 410 is connected to the at least one sensor 411-415. The sensor(s) can be any suitable sensor(s) for sensing conditions or characteristics of at least part of the environment 800 in the vicinity of the tugboat 401. In this embodiment, the sensors are a Light Detection and Ranging (LIDAR) sensor 411, a Sound Navigation and Ranging (SONAR) sensor 412, a Radio Detection and Ranging (RADAR) sensor 413, one or more cameras 414, and one or more microphones 415. In other embodiments, the LIDAR sensor 411 may be omitted, and/or the SONAR sensor 412 may be omitted, and/or the RADAR sensor 413 may be omitted, and/or the camera(s) 414 may be omitted, and/or the microphone(s) 415 may be omitted. In some embodiments, the situational awareness module 410 may be connected to one or more other sensors for sensing surroundings information representative of at least part of the environment 800, such as sensors for sensing water conditions, weather conditions, or wave heights, or an ultrasound for sensing surroundings information above water.

It will be understood that some of the sensors of the tugboat 401 are suitable for sensing surroundings information that is representative of topography of the at least part of the environment 800, such as the ship 700 (or a part thereof). For example, the LIDAR sensor 411, the SONAR sensor 412, the RADAR sensor 413, and the one or more cameras 414 may be suitable for sensing such surroundings information representative of topography. In some embodiments, the tugboat 401 comprises one or more of these types of sensor for sensing surroundings information that is representative of topography of the at least part of the environment 800. In other embodiments, the sensor(s) of the tugboat 401 may not be suitable for sensing surroundings information representative of topography.

The cameras 414 may comprise a plurality of cameras 414 situated around the periphery of the tugboat 401. The plurality of cameras 414 can comprise a digital camera arrangement with a 360-degree field of vision in the horizontal plane, to offer a full view of the area around the tugboat 401. In some embodiments, the output of a plurality of cameras may be stitched together to make a 360-degree view. One or more of the cameras 414 may operate in the visual part of the spectrum and/or outside the visual part of the spectrum. For example, one or more of the cameras 414 may be infrared cameras and/or night vision cameras for operation in low light conditions. An infrared camera may, for example, be usable to penetrate mist or fog.

The microphones 415 may comprise a plurality of microphones located around the periphery of the tugboat 401 to detect audio in the vicinity of the tugboat 401. In some embodiments, the microphones 415 are directional microphones for detecting audio originating from a particular direction.

The situational awareness module 410 is configured to send the surroundings information received from the sensors 411-415 to the controller 430. This means that the controller 430 receives a current situation status based on the output of the one or more sensors 411-415. The surroundings information received from the sensors 411-415 at the controller 430 may include surroundings information representative of, or related to, a location of the ship 700 in the environment 800.

In some embodiments, the controller 430 may be configured to cause all or part of the surroundings information it receives to be sent to an onboard display module 440 and/or to an onboard acoustic module 450. The display module 440 is configured to output visual information to one or more displays 441. The display(s) 441 may be mounted in a wheelhouse of the tugboat 401, or elsewhere. Similarly, the audio information received by the microphone(s) 415 may be output by the acoustic module 450 to one or more speakers 451 mounted in the same area as the display(s) 441, or elsewhere.

The controller 430 is connected to a manoeuvring module 460. The manoeuvring module 460 is configured to control one or more manoeuvring units 461-465 of the tugboat 401. Each of the manoeuvring units 461-465 is for controlling movement of the tugboat 401 in water. In this way, on the basis of instruction(s) received from the controller 430, the manoeuvring module 460 sends signal(s) to the one or more manoeuvring units 461-465 to change the course and/or speed of the tugboat 401. In this embodiment, the manoeuvring units 461-465 of the tugboat 401 are a propeller 461, a thruster 462, a rudder 463, an azipod 464, and an engine 465. In other embodiments, the propeller 461 may be omitted, and/or the thruster 462 may be omitted, and/or the rudder 463 may be omitted, and/or the azipod 464 may be omitted. In some embodiments, the tugboat 401 may have one or more bow side thrusters or one or more after side thrusters as manoeuvring unit(s). The manoeuvring module 460 may send information relating to the current status of the or each of the manoeuvring units 461-465 to the controller 430, so that the controller 430 receives a complete status picture of the manoeuvring units 461-465.

The controller 430 also is connected to a position module 470. The position module 470 is connected to one or more position sensors 471, such as a global positioning sensor, and to one or more motion sensors 472, such as an accelerometer. The position sensor 471 is configured to detect the position of the tugboat 401 on Earth. The motion sensor 472 is configured to detect movement of the tugboat 401, such as pitch, yaw, and roll of the tugboat 401. The position information and the movement information are sent to the controller 430, so that the controller 430 receives information concerning the position and movement of the tugboat 401. The controller 430 may map the position information and/or the movement information (or data points thereof) to surroundings information sensed by the sensor(s) 411-415, to facilitate future creation of a virtual representation using the surroundings information.

The controller 430 is connected to a tugboat control interface module 480. The tugboat control interface module 480 receives signals and input instructions from the crew in the wheelhouse of the tugboat 401 via a tugboat control interface 481 that is connected to the tugboat control interface module 480. The tugboat control interface 481 comprises one or more input devices for the crew to dictate operation of systems of the tugboat 401. In some embodiments, the tugboat control interface 481 comprises one or more touch screens, keyboards, wheels or joysticks, for example.

The controller 430 is connected to the transmitter 420 for transmitting information from the tugboat 401 to the control centre 500. The transmitted information can comprise any information relating to the tugboat 401. In this embodiment, the controller 430 is configured to cause the surroundings information sensed by the at least one sensor 411-415 to be transmitted via the transmitter 420 to the receiver 520 of the control centre 500. In some embodiments, the surroundings information comprises any information relating to the current status of the tugboat 401—i.e. real-time information. However, the surroundings information can also include historical information. In some embodiments, the surroundings information comprises images and/or videos from the camera(s) 414 showing one or more fields of view of around the container ship, LIDAR information from the LIDAR sensor 411, SONAR information from the SONAR sensor 412, RADAR information from the RADAR sensor 413, sound information from the microphone(s) 415, position information from the position sensor(s) 471, movement information from the movement sensor(s) 472, and information from the manoeuvring units 461-465.

While a detailed description of a tugboat 401 according to an embodiment, and some variations thereto, has been given above, it will be appreciated that not all of the described modules, sensors and other elements may be present in other embodiments.

As noted above, each of the other beacons 101, 102, 201, 202, 301, 302 of the system 1000 comprises at least one sensor 101a, 102a, 201a, 202a, 301a, 302a for sensing surroundings information representative of at least part of the environment 800. Similarly to the tugboat 401 described above, the at least one sensor of each of these other beacons 101, 102, 201, 202, 301, 302 may comprise one or more of: a camera, a LIDAR sensor, a SONAR sensor, a RADAR sensor and a microphone. Moreover, at least one of the sensors of each of these other beacons 101, 102, 201, 202, 301, 302 may be suitable for sensing surroundings information that is representative of topography of at least part of the environment 800, such as the ship 700 when in the environment 800. In other embodiments, the sensor(s) of these other beacons 101, 102, 201, 202, 301, 302 may not be suitable for sensing surroundings information representative specifically of topography.

In some embodiments, transmission of information from the transmitter(s) 101b, 102b, 201b, 202b, 301b, 302b, 420 of the beacon(s) 101, 102, 201, 202, 301, 302, 401-403 to the receiver 520 of the control centre 500 may be wireless transmission, such as over a licensed or an unlicensed mobile communications network. In some embodiments, transmission from transmitters of static beacon(s) could be over a wired network, such as a broadband network.

Figure 3:
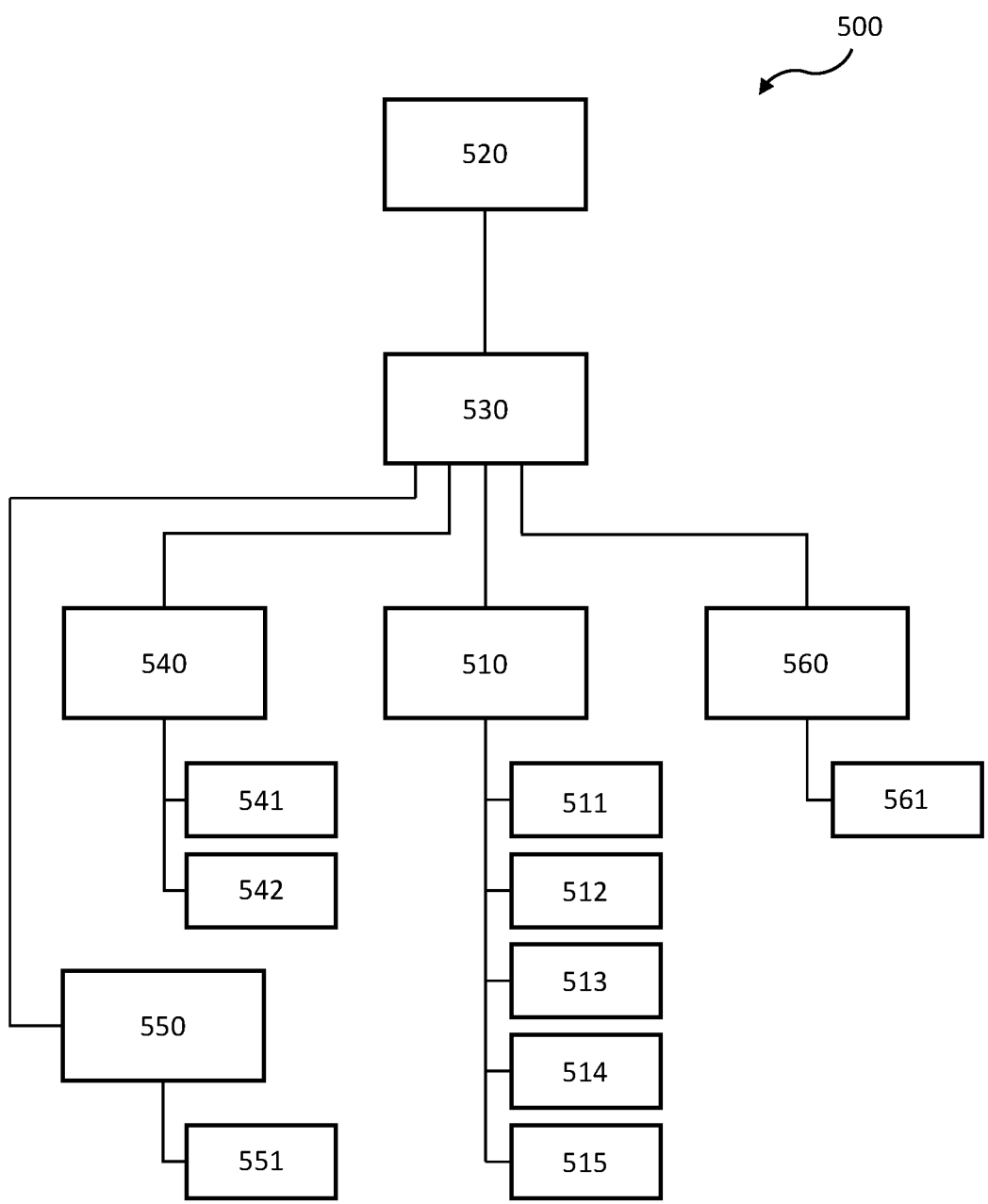
FIG. 3 shows a schematic view of an example of a control centre of the system of FIG. 1.

Referring to FIG. 3, there is shown a schematic view of the control centre 500 of the system 1000 of FIG. 1.

In this embodiment, the control centre 500 is remote from each of the beacons, but in other embodiments the control centre 500 could be comprised in one of the beacons, such as in one of the static land-based beacons 101, 102. Moreover, in this embodiment, the control centre 500 is land-based, but in other embodiments it may be water-based. Still further, in this embodiment, the control centre 500 is within or closely adjacent to the environment 800 in question, but in other embodiments it could remote (such as tens or hundreds of miles away) from the environment 800.

The control centre 500 comprises one or more modules for controlling systems within the control centre 500. In some embodiments, the modules are part of the controller 530. Alternatively, the functionality of the modules may be located in one or more ancillary control units positioned in the control centre 500, separate from the controller 530. The functionality of the controller 530 and the modules can be implemented with software, hardware or a combination of both.

In this embodiment, the receiver 520 is a transmitter-receiver, which is configured to receive information and to transmit information. In other embodiments, the control centre 500 may comprise one or more transmitters for transmitting information and one or more separate receivers for receiving information, or a plurality of transmitter-receivers for communicating with respective different entities (e.g. the beacon(s), the terminal 600, and the ship 700).

As noted above, the receiver 520 is configured to receive the surroundings information from the transmitter(s) 101b, 102b, 201b, 202b, 301b, 302b, 420 of the beacon(s) 101, 102, 201, 202, 301, 302, 401-403 and send it to the control unit 530. For brevity, the following discussion will focus primarily on the handling of surroundings information received at the control centre 500 from the tugboat 401. However, it will be appreciated that the control centre 500 is configured to correspondingly handle surroundings information received at the control centre 500 from others of the beacons 101, 102, 201, 202, 301, 302, 402, 403.

The control unit 530 sends, to a display module 510, visual components of the surroundings information received. These visual components may comprise one or more images and/or videos from the cameras 414, LIDAR information from the LIDAR sensor 411, SONAR information from the SONAR sensor 412, and/or RADAR information from the RADAR sensor 413. The display module 510 causes these respective visual components to be output on one or more displays, including a camera output display 511, a LIDAR display 512, a SONAR display 513, and a RADAR display 514, for example in a dynamic, or even more specifically a real-time, manner. In some embodiments, the camera output display 511 is a 360-degree display. The visual components may include a representation of a location of the ship 700 in the environment 800. Additional surroundings information, such as information relating to one or more of the manoeuvring units 461-465 and/or position information from the position sensor(s) 471 and/or movement information from the movement sensor(s) 472 can further be displayed on one or more additional displays 515. In some embodiments, surroundings information from more than one of the beacons is used to derive the visual components displayed on one or more of the displays 511-515.

In some embodiments, use is made of augmented reality. In some embodiments, the surroundings information sensed by the LIDAR, SONOR and/or RADAR sensors 411-413 may be overlaid on the surroundings information sensed by the camera(s) 414, on the same one of the displays 511-514. In some embodiments, other information, such as the heading of the ship 700 or of a tugboat or of a mobile beacon, may be overlaid on the surroundings information sensed by the camera(s) 414, on the same one of the displays 511-514. In some embodiments, the display module 510 is configured to output the visual components to a virtual reality headset or other portable display screen.

In some embodiments, the control centre 500 may not be in visual contact with one or more of the beacon(s), and so the surroundings information received from the beacon(s) allows the pilot in the control centre 500 to obtain a complete understanding of the immediate real-time status of the environment 800.

The control unit 530 sends, to an acoustic module 540, audible components of the surroundings information received. These audible components may comprise surroundings information sensed by the one or more microphones 415. The acoustic module 540 causes these audible components to be output by one or more speakers 541, such as in real-time. In some embodiments, surroundings information from more than one of the beacons is used to derive the audible components output by the speaker(s) 541.

As noted previously, the control unit 530 is configured to determine (e.g. generate) a virtual representation of at least part of the environment 800 based on the surroundings information received. The virtual representation may be generated from surroundings information received from one of the beacons, or from a plurality or all of the beacons. In some embodiments, the virtual representation is a visual or visible virtual representation. In some embodiments, the virtual representation is a dynamic virtual representation. For example, the virtual representation may depict one or more vessels moving through the virtual representation of the environment. In some embodiments, the surroundings information is representative of topography of the environment 800, and the control unit 530 is configured to determine a topographical map of at least part of the environment 800 based on the surroundings information received. For example, in some embodiments in which the surroundings information comprises, at least in part, information sensed by one or more LIDAR sensor(s) 411 of the beacon(s), the control unit 530 may be configured to determine a LIDAR map of at least part of the environment 800. In any event, the virtual representation may include a representation of a location of the ship 700 in the environment 800.

In some embodiments, the virtual representation is determined using information sensed by one or more LIDAR sensor(s) 411 of the beacon(s), instead of using information sensed by one or more RADAR(s) 413 of the beacon(s), because RADAR may have insufficient resolution to enable the creation of a sufficiently fine or precise virtual representation for use in precision operations such as berthing.

It will be appreciated that, since beacon(s) 101, 102, 201, 202, 301, 302, 401-403 remote from the ship 700 are employed, the system 1000 is usable to aid navigation of ships that do not themselves comprise sensor(s) for sensing surroundings information representative of at least part of the environment 800. Accordingly, the system 1000 is versatile and can be implemented without any modifications being required to shipping fleets, and furthermore can be used to determine a virtual representation of at least part of the environment 800 before the ship 700 has arrived in the environment 800.

In some embodiments, the control unit 530 is configured to determine (e.g. generate) the virtual representation based not only on the surroundings information received, but also based on information about the environment 800 from one or more other sources. An example such other source of information is one or more database(s) 551, at the control centre 500 or remote from the control centre 500, that is/are accessible by the control unit 530 via an information module 550. Such database(s) may comprise information on currents, depths or navigation charts, for example.

The control unit 530 may be configured to display the virtual representation on one or more of the displays 511-515. Accordingly, if the pilot is located at the control centre 500, they are able to observe the virtual representation.

In some embodiments, the pilot may not be located at the control centre 500, yet the pilot still may be able to observe the virtual representation. For example, in some embodiments, such as that illustrated in FIG. 1, the control centre 500 comprises a transmitter 520 connected to the control unit 530, and the control unit 530 is configured to cause the virtual representation to be transmitted by the transmitter 520 of the control centre 500. Moreover, the system 1000 may comprise a terminal 600 with a receiver 620 configured to receive the virtual representation from the transmitter 520 of the control centre 500. The terminal may also comprise an output device 610 and a control unit 630 connected to the receiver 620 and the output device 610 and configured to cause information (such as a representation of the virtual representation, or other representation of the environment 800) to be output on the output device 610 based on the virtual representation received. In some embodiments, the terminal 600 is portable. For example, the terminal may be a smartphone, a tablet computer, a so-called phablet computer, or another mobile electronic device. This allows the pilot to be mobile on land or on water and still to receive the virtual representation and/or observe information based on the virtual representation. This means that the captain of the ship 700 can still require the pilot to board the ship 700, for example if class, flag, or insurers require, and the pilot can still receive the virtual representation and/or observe information based on the virtual representation.

In some embodiments, such as those without a separate terminal 600, the control centre 500 itself may be portable. For example, the control centre 500 may be comprised in a smartphone, a tablet computer, a so-called phablet computer, or another mobile electronic device. Again, this allows the pilot to be mobile on land or on water.

In still further embodiments, the control unit 530 of the control centre 500 may be configured to cause the virtual representation to be transmitted by the transmitter 520 to the ship 700 itself, and the ship 700 may have a display configured to display the virtual representation received. Accordingly, the captain or crew of the ship 700 are able to observe the virtual representation and/or information based on the virtual representation, to help their navigation of the ship 700 in the environment 800. Alternatively, the pilot may still board the ship 700 and observe the virtual representation and/or information on the display of the ship 700, and either control the ship 700 or provide navigation instructions (or at least information on the ship's 700 surroundings) to the captain so that the captain is able to navigate the ship 700 through the environment 800 without issue.

In some embodiments, the pilot is able to create, or otherwise determine, navigation information for use in assisting navigation of the ship 700, based on the surroundings information or based on the virtual representation. In some embodiments, the pilot creates, or determines, the navigation information based not only on the surroundings information received, but also based on information about the environment 800 from one or more other sources, such as the content of the database(s) 551 discussed above.

The navigation information can take different forms. In some embodiments, the navigation information may comprise general guidance. In other embodiments, the navigation information can comprise course heading information, such as a bearing and a vessel speed. The pilot may input the navigation information using a user interface 561. The user interface 561 may replicate the controls and instruments of the ship 700. Alternatively, or additionally, the user interface 561 may comprise another type of input device, such as a touchscreen, a keyboard, or a mouse. A pilot interface module 560 receives the input provided by the pilot to the user interface 561 and converts the inputs into navigation information. The navigation information is then sent to the control unit 530 for transmission by the transmitter 520. In some embodiments, the pilot is able to create audible navigation information for use in assisting navigation of the ship 700. The pilot may input the audible navigation information using a microphone 542, and then the acoustic module 540 records the audible input provided by the pilot to the microphone 542 sends it to the control unit 530 for transmission by the transmitter 520.

Alternatively, or additionally, the control unit 530 of the control centre 500 may itself be configured to determine navigation information for use in assisting navigation of the ship 700, based on the surroundings information received at the control centre 500 and/or based on the virtual representation determined at the control centre 500 and optionally also based on information about the environment 800 from one or more other sources, such as the content of the database(s) 551 discussed above. The control unit 530 may be configured to do this automatically, or without substantive input by the pilot. To enable this, in some embodiments it is necessary for control unit 530 to have knowledge of the position of the ship 700. For example, in some embodiments, the control unit 530 may receive information relating to the position of the ship 700 from the ship 700 or from one or more of the beacon(s), via the receiver 520 of the control centre 500. Alternatively, or additionally, the control unit 530 may receive information relating to the position of the ship 700 from elsewhere, such as from the pilot interface module 560 if, for example, the pilot inputs suitable information into the user interface 561. The information input by the pilot may be received by the pilot from the ship 700 over a communications interface.

The transmitter 520 may, for example, be configured to transmit the navigation information to the terminal 600 or to the ship 700, for use by the pilot to advise the ship's captain or crew, or for use directly by the ship's captain or crew. In this way, in some embodiments the captain of the ship 700 is able to interpret the navigation information, such as according to the responsiveness and manoeuvrability of the ship 700, and in other embodiments the pilot may take control of the ship 700 and navigate it through the environment 800 using the navigation information.

As will be understood, in some embodiments the virtual representation of at least part of an environment may be for use in assisting navigation of a ship in the environment. In some embodiments, the virtual representation may be used to track one or more vessels through the environment, such as a port. In some embodiments, the system 1000 (e.g. the control unit 530 of the control centre 500) could use the virtual representation to record vessel collisions in the environment.

It is preferable to have a relatively detailed virtual representation of the environment 800 on setup of the system 1000. This may require one of the mobile water-based beacons (e.g. a tugboat) 401-403 fitted with one or more e.g. LIDAR sensors 411 to move slowly around all (or a majority of) the environment 800 to collect sufficient surroundings information to form a baseline or initial virtual representation of at least part of the environment 800.

In some embodiments, after the baseline virtual representation has been determined, the control unit 530 is configured to update at least a portion of the virtual representation based on further surroundings information sensed by the at least one sensor of the beacon(s) 101, 102, 201, 202, 301, 302, 401-403 and received via the receiver 520 of the control unit 530. For example, the receiver 520 of the control centre 500 may receive periodic or constant updates of surroundings information from one or more of the beacons. The updates are important because they show the change between the baseline virtual representation and the current, or a more recent, status of the environment 800. Such periodic need only update the part(s) of the baseline virtual representation that have changed (for example, if a vessel has moved into the environment 800). The updates can therefore be smaller in data size and reduce the communications (e.g. wireless) network burden. Accordingly, battery-powered beacons may be able to operate less frequently than beacons with a fixed power source, such as the tugboats 401-403 or the static land-based beacons 101, 102.

In some embodiments, the virtual representation of a marine environment is a dynamic virtual representation of the marine environment. In some such embodiments, periodic updates received from one or more of the beacons are used to update the virtual representation of the environment. Accordingly, the virtual representation can reflect changes to the environment, such as changes to the coastline over long periods of time. Over shorter periods of time, the virtual representation can show rapidly moving objects such as waves, vessels, and wildlife.

In some embodiments, the updates are received by the control centre 500 in real-time, so that each beacon 101, 102, 201, 202, 301, 302, 401-403 in the system 100 is constantly providing updated surroundings information to the control centre 500. Alternatively, the updates can occur periodically, such as once every minute, once every 30 seconds, once every 15 seconds, once every 5 seconds, once every second, or at a different frequency. The periodicity of updates can be varied, such as depending on the amount of water traffic and the speed of the vessels in the environment 800.

Tugboats 401-403 are responsible for moving large vessels in, out, and around the environment 800. Accordingly, during their normal duties, the tugboats 401-403 are relatively highly mobile and will be proximal to most of the water traffic and much of the environment 800. Therefore, tugboats 401-403 are highly suited to comprising beacons, because they may be able to sense surroundings information relating to a relatively large proportion of the environment 800 without straying from their otherwise intended courses. However, they are also relatively easily moveable from their otherwise intended courses, should the need arise to sense parts of the environment 800 away from those courses.

Over time, the control unit 530 may determine that there are one or more portions of the virtual representation of the environment 800 that have not been updated for greater than a predetermined period, or that there are one or more portions of the environment 800 that have never been included in a virtual representation. The control unit 530 may be configured to instruct one of the beacons 101, 102, 201, 202, 301, 302, 401-403 to sense surroundings information representative of at least part of the environment 800, for use in updating the baseline virtual representation. The instruction may include address information or some other identifier of the beacon 101, 102, 201, 202, 301, 302, 401-403 to be instructed, so that only the intended beacon 101, 102, 201, 202, 301, 302, 401-403 reacts to the instruction. Alternatively, the instruction may be sent only to the intended beacon 101, 102, 201, 202, 301, 302, 401-403 via a communications channel that connects only the control centre 500 and the relevant beacon 101, 102, 201, 202, 301, 302, 401-403.

For example, in some embodiments, the control unit 530 is configured to generate an instruction to one of the mobile beacons 201, 202, 401-403, such as one of the tugboats 401-403, to sense surroundings information representative of at least part of the environment 800, and to cause the transmitter 520 of the control centre 500 to transmit the instruction. The receiver 420 of the relevant mobile beacon 201, 202, 401-403 receives the instruction, and the controller 430 may cause contents of the instruction to be presented visually or audibly to a captain or other operative of the mobile beacon 201, 202, 401-403, such as using the display 441 or the speaker 451. The operative may then follow directions comprised in the instruction, such that the mobile beacon 201, 202, 401-403 is positioned in an appropriate location such that the sensor(s) 411-415 of the mobile beacon 201, 202, 401-403 are able to sense surroundings information representative of the non-sensed or out-of-date part(s) of the environment 800. In a variation, in some embodiments, the controller 430 of the relevant beacon may itself be configured to control the one or more manoeuvring units 461-465 based on the instruction, such as via the manoeuvring module 460. That is, the mobile beacon may be an autonomous beacon. The surroundings information subsequently sensed by the sensor(s) 411-415 of the relevant mobile beacon is then transmitted to the control centre 500 as discussed elsewhere herein.

In some embodiments, one or more previous versions of the virtual representation may be stored, e.g. in the database(s) 551, so that the control centre 500 maintains access to a historic record of vessel traffic and other changes in the environment 800 over time.

Example methods of determining a virtual representation of at least part of an environment that is navigable by a ship will now be described. The environment may be a marine environment.

FIG. 4 shows a flow chart illustrating an example of such a method, according to an embodiment of the present invention. The method 40 comprises receiving 41, from a beacon remote from the ship and at a control centre remote from the ship, surroundings information representative of at least part of the environment. The beacon may, for example, be any beacon 101, 102, 201, 202, 301, 302, 401-403 or any variant thereof discussed herein. The control centre may, for example, be the control centre 500 or any variant thereof discussed herein. The environment may, for example, be the environment 800 or any variant thereof discussed herein, such as a harbour or port. The method 40 also comprises determining 42 a virtual representation of at least part of the environment based on the surroundings information. The virtual representation may, for example, comprise a topographical map, such as a LIDAR map, or any of the other virtual representations or variants thereof discussed herein. For example, the virtual representation may comprise a composite map or representation created using one or more of: one or more images, one or more videos, LIDAR information from one or more LIDAR sensors, SONAR information from one or more SONAR sensors, RADAR information from one or more RADAR sensors, sound information from one or more microphones, position information from one or more position sensors, and movement information from one or more movement sensors. In some embodiments, the composite map or representation may be a composite of above water and below water, e.g. created using LIDAR information from one or more LIDAR sensors, and SONAR information from one or more SONAR sensors.

Further methods of determining a virtual representation of at least part of an environment that is navigable by a ship will now be described with reference to FIGS. 1 to 3 and FIG. 5. These methods will be described with reference to the system 1000 and environment 800 of FIG. 1, the tugboat 401 of FIG. 2, and the control centre 500 of FIG. 3, but it will be appreciated that in other embodiments the system and/or environment and/or beacon and/or control centre used in any of the methods may, for example, be any of the variations to the system 1000, environment 800, tugboat 401, and control centre 500 described herein.

In some embodiments, the method 50 comprises receiving 51 surroundings information representative of at least part of the environment 800 from the transmitter 101b, 102b, 201b, 202b, 301b, 302b, 420 of one or more of the beacons 101, 102, 201, 202, 301, 302, 401-403 in the system 1000. The environment 800 may, for example, comprise one or more of: a harbour, a port, a bay, a dockyard, a navigable channel, a lake, a canal, and a river. The beacon(s) may be one or more static land-based beacons 101, 102, one or more mobile land-based beacons 201, 202, one or more static water-based beacons (such as buoys) 301, 302, and/or one or more mobile water-based beacons (such as tugboats) 401-403. The surroundings information is information that has been sensed by at least one sensor of the, or each, beacon 101, 102, 201, 202, 301, 302, 401-403. In some embodiments, the surroundings information comprises surroundings information sensed by one or more of a camera, a LIDAR sensor, a SONAR, and a RADAR. In some embodiments, the surroundings information is representative of topography of the at least part of the environment 800. The surroundings information may be received at the control unit 530 of the control centre 500, via the receiver 520 of the control centre 500.

The method also comprises determining 52 a virtual representation of at least part of the environment 800, based on the surroundings information received from the one or more beacons 101, 102, 201, 202, 301, 302, 401-403. In some embodiments, the determining 52 comprises determining a topographical map of the at least part of the environment 800 based on the surroundings information received. In some embodiments, and particularly if the surroundings information received comprises surroundings information sensed by one or more LIDAR sensors of the beacon(s), the topographical map comprises a LIDAR map. The determining 52 the virtual representation may comprise generating the virtual representation, or in some circumstances it may comprise selecting the virtual representation from a plurality of existing virtual representations, which may be stored in a database to which the control unit 530 of the control centre 500 has access.

In some embodiments, the method comprises a determination 53 as to whether further surroundings information sensed by the at least one sensor of the, or each, beacon 101, 102, 201, 202, 301, 302, 401-403 has been received. Such reception of further surroundings information may be periodic or constant (e.g. real-time). In some embodiments, when such further surroundings information has been received, the method comprises updating 54 at least a portion of the virtual representation based on the further surroundings information, such that an updated version of the virtual representation is determined 52. In other embodiments, the result of the determination 53 may be that no such further surroundings information has been received.

In some embodiments, if no such further surroundings information has been received (or no still further surroundings information has been received following an update 54 of the virtual representation), the method may comprise a determination 55 as to whether an instruction to sense surroundings information representative of at least part of the environment 800 should be sent to one or more of the beacons 101, 102, 201, 202, 301, 302, 401-403. Such a determination 55 may be based on an analysis of the determined virtual representation to identify whether there is/are any portion(s) of the virtual representation that have not been updated for greater than a predetermined period, or that have never been sensed by the sensor(s) of the beacon(s). In some embodiments, when the result of such a determination 55 is positive, the method comprises causing 56 the transmitter 520 of the control centre 500 to transmit such an instruction to one or more of the beacons 101, 102, 201, 202, 301, 302, 401-403, such as one of the tugboats 410-403. The method then returns to block 53. In other embodiments, the result of the determination 55 may be that no such instruction need be sent.

In some embodiments, the method comprises a determination 57 as to whether the virtual representation is to be transmitted from the control centre 500 to another entity, such as a terminal 600 of the system 1000 or a ship 700 (such as a ship to be assisted). Such transmission may be beneficial when the virtual representation is to be used by a pilot away from the control centre 500 or by a captain or crew of the ship 700. In some embodiments, when the result of such a determination 57 is positive, the method comprises causing 58 the transmitter 520 of the control centre 500 to transmit the virtual representation to the other entity. The method then returns to block 53. In other embodiments, the result of the determination 57 may be that the virtual representation need not be so transmitted. For example, the pilot may use the virtual representation at the control centre 500 and communicate navigation or other instructions to the ship 700 over a communications channel, such as a Radio Frequency (RF) radio, based on the virtual representation.

In some embodiments, the method comprises a determination 59 as to whether navigation information, based on the virtual representation or the surroundings information received, for use in assisting navigation of the ship is to be determined. In some embodiments, the result of such a determination 59 may be that such navigation information is not needed, at least at present, and the method then returns to block 53. In other embodiments, when the result of the determination 59 is positive, the method comprises determining 60 such navigation information based on the virtual representation or the surroundings information received. Moreover, in some embodiments, the method then comprises a determination 61 as to whether the determined navigation information is to be transmitted from the control centre 500 to another entity, such as a terminal 600 of the system 1000 or a ship 700 (such as a ship to be assisted). Such transmission may be beneficial when the navigation information is to be used by a pilot away from the control centre 500 or by a captain or crew of the ship 700. In some embodiments, when the result of such a determination 61 is positive, the method comprises causing 62 the transmitter 520 of the control centre 500 to transmit the navigation information to the other entity, and then the method returns to block 53. In other embodiments, the result of the determination 61 may be that the navigation information need not be so transmitted. For example, the pilot may use the navigation information at the control centre 500 and communicate instructions to the ship 700 over a communications channel, such as an RF radio, based on the navigation information. In some embodiments, the method then returns to block 53.

In some embodiments, the method may be performed by the controller 530 of the control centre 500. There is thus also provided a non-transitory computer-readable storage medium storing instructions that, if executed by a processor of a control centre 500, cause the processor to carry out the method. The processor may be the controller 530 of the control centre 500.

It will therefore be appreciated that, in some embodiments, the various beacons are usable to build up an accurate picture of at least part of an environment, such as a harbour or port, that a pilot is able to use to issue instructions to the captain of a ship that is to move within the environment, or that the captain themselves is able to use, so that the captain is able to navigate the environment without issue. The pilot thus need not board the ship in some embodiments. Moreover, since the sensor(s) used to sense the surroundings information that is used to determine the virtual representation need not be on the ship itself, the invention can be implemented without any modifications being required to shipping fleets. Furthermore, some embodiments of the invention can be used to determine a virtual representation of at least part of the environment before the ship has arrived in the environment.

In other embodiments, two or more of the above described embodiments may be combined. In other embodiments, features of one embodiment may be combined with features of one or more other embodiments.

Embodiments of the present invention have been discussed with particular reference to the examples illustrated. However, it will be appreciated that variations and modifications may be made to the examples described within the scope of the invention.

What is claimed is:

1. A system for determining a virtual representation of at least part of an environment that is navigable by a ship, the system having:
   one or more beacons remote from the ship, each of the one or more beacons comprising:
      a sensor unit for sensing surroundings information representative of topography of at least part of the environment, the surroundings information comprising information representative of a further ship on a surface of a waterway,
      a transmitter, and
      a controller connected to the at least one sensor and configured to cause the surroundings information to be transmitted via the transmitter; and
   a control centre remote from the ship, the control centre comprising:
      a receiver configured to receive the surroundings information and a current position of the ship, and
      a control unit connected to the receiver and configured to determine a dynamic virtual representation of at least part of the environment based on the surroundings information, wherein the dynamic virtual representation comprises a dynamic topographical map and includes a representation of the further ship on the waterway, the control unit configured to determine, based at least in part on the virtual representation and on the current position of the ship, navigation information to direct navigation of the ship in the waterway, the navigation information comprising course heading information for the ship to follow when navigating in the waterway, the control unit configured to cause the navigation information to be transmitted to the ship via a control centre transmitter.

2. The system according to claim 1, wherein the control centre comprises a transmitter connected to the control unit, and wherein the control unit is configured to cause the dynamic virtual representation to be transmitted by the transmitter of the control centre.

3. The system according to claim 2, wherein the system has a terminal, comprising:
   a receiver configured to receive the dynamic virtual representation,
   an output device, and
   a control unit connected to the receiver of the terminal and configured to cause information to be output on the output device based on the dynamic virtual representation received.

4. The system according to claim 1, wherein the dynamic topographical map comprises a LIDAR map.

5. The system according to claim 1, wherein the control unit is configured to generate an instruction to sense surroundings information representative of a portion of the environment based at least in part on a determination that previous surroundings information associated with the portion of the environment should be updated,
   wherein the control centre comprises a transmitter connected to the control unit,
   wherein the control unit is configured to cause the transmitter of the control centre to transmit the instruction, and
   wherein each of the one or more beacons comprises:
      a receiver configured to receive the instruction; and
      one or more manoeuvring units for controlling movement of the beacon in water,
      wherein the controller of each of the one or more beacons is configured to control the one or more manoeuvring units based on the instruction to move the beacon to sense the surroundings information of the portion of the environment.

6. The system according to claim 1, wherein the one or more beacons comprise a plurality of beacons, which comprises at least one of: a static land-based beacon, a mobile land-based beacon, a static water-based beacon, or a mobile water-based beacon.

7. The system according to claim 1, wherein the sensor unit comprises one or more of: a camera, a LIDAR sensor, a SONAR, and a RADAR.

8. The system according to claim 1, wherein the surroundings information comprises one or more of: one or more images, one or more videos, LIDAR information from one or more LIDAR sensors, SONAR information from one or more SONAR sensors, RADAR information from one or more RADAR sensors, sound information from one or more microphones, position information from one or more position sensors, and movement information from one or more movement sensors.

9. A method of determining a dynamic virtual representation of at least part of an environment that is navigable by a ship, the method comprising:
   receiving, from one or more beacons remote from the ship and at a control centre remote from the ship, surroundings information representative of topography of at least part of the environment, the surroundings information comprising information representative of a further ship on a surface of a waterway;
   receiving a current position of the ship;
   determining a dynamic virtual representation of at least part of the environment based on the surroundings information, wherein the determining comprises determining a dynamic topographical map of the at least part of the environment based on the surroundings information, the dynamic virtual representation including a representation of the further ship on the waterway;
   determining, based at least in part on the virtual representation and on the current position of the ship, navigation information for use in assisting navigation of the ship, the navigation information comprising course heading information for the ship to follow when navigating in the waterway; and
   causing a transmitter of the control centre to transmit the navigation information.

10. The method according to claim 9, wherein the one or more beacons comprise a plurality of beacons, and wherein the method comprises receiving, from said plurality of beacons, at a control centre remote from the ship, surroundings information representative of at least part of the environment, and
   determining the virtual representation of the at least part of the environment based on the surroundings information received from the plurality of beacons.

11. A non-transitory computer-readable storage medium storing instructions that, if executed by a processor of a control centre, cause the processor to carry out the method of claim 9.

* * * * *